Nov. 30, 1965  R. A. MATHIAS  3,220,315
MACHINE TOOL ADAPTIVE CONTROL
Filed May 15, 1964  3 Sheets-Sheet 1
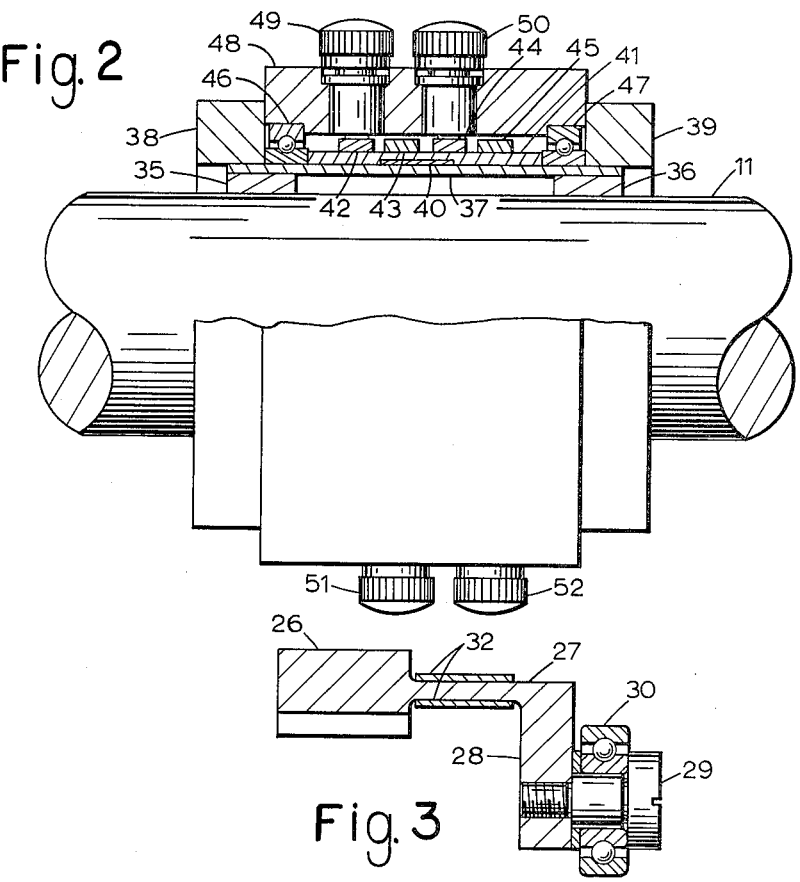
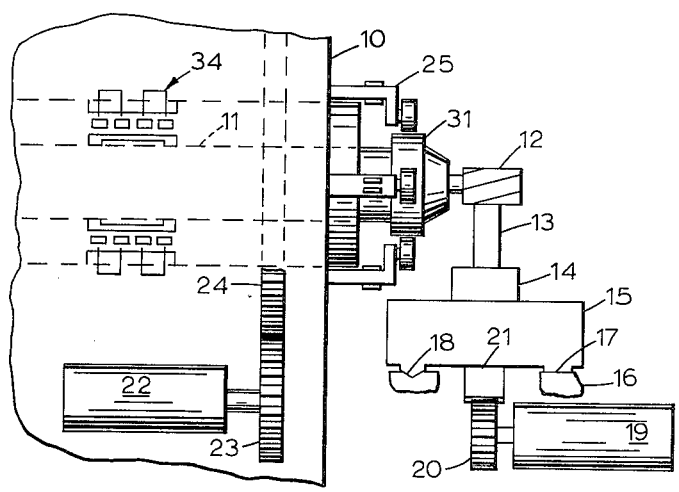
INVENTOR
RICHARD A. MATHIAS
BY
*Howard S. Keiser*
*& Jack J. Earl*
ATTORNEYS

United States Patent Office 3,220,315
Patented Nov. 30, 1965

3,220,315
MACHINE TOOL ADAPTIVE CONTROL
Richard A. Mathias, Cincinnati, Ohio, assignor to The Cincinnati Milling Machine Co., Cincinnati, Ohio, a corporation of Ohio
Filed May 15, 1964, Ser. No. 367,762
21 Claims. (Cl. 90—21)

This invention relates to automatic machine tool controls and more particularly to a control machanism that is self adapting to cutting conditions and is especially suitable for use in a metal cutting machine tool.

In metal cutting operations such as milling, drilling and boring and as conventionally known in the past, a cutting tool was rotated at a preselected speed and the tool and a workpiece were relatively moved together at a preselected constant feed rate. The preselected feeds and speeds were based upon the supposition that for any given material and tool, the various parameters such as machinability of material and geometry of the cutting tool would remain constant and therefore the use of a single constant cut speed and a uniform chip thickness would produce as efficient a cutting operation as could be had. Recent experimental techniques have revealed that the machining parameters do not remain constant but rather are constantly fluctuating so that the conventional cutting practices of the past are not the most efficient means of metal removal. It is now known that removal of a chip is accompanied by an amount of plastic deformation of the work in the zone of tool and work contact and that strains remain in the zone after chip removal which result in the phenomenon of work hardening. The factors which cause work hardening have been established to be mainly dependent upon shear strength of the work material and the state of wear of the tool, the latter being an accelerating factor since as the tool begins to show the effects of wear, increased work hardening occurs to produce even more wear until catastrophic failure of the cutter results. Recent metallurgical advances have produced high strength alloys, now termed "exotic," in the metals art and these in particular are difficult to machine due to their increased tendency to work harden during cutting.

It is therefore an object of this invention to provide a control mechanism which adapts itself to cutting conditions and which will permit the machining of high strength alloys as well as mild materials at increased rates with reduced machining costs.

It is also an object of this invention to provide a mechanism capable of performing optimal economic machining operations with improved surface finishes and dimensional tolerances.

It is a further object of this invention to provide a machine tool control mechanism in which cutting speed is automatically regulated to maintain the cutter wear rate constant despite hard spots and areas of different machinabilities and therefore to prolong tool life and prevent catastrophic cutter failure.

Yet another object of the invention is to provide a control system which causes a reduction in the tendency toward work hardening of metals and a reduction in residual stress after machining.

Also an object of this invention is the provision of a control system for a machine tool which automatically adjusts cutting speeds for safe cutting of materials of unknown machinability.

A still further object of this invention is the provision of an adaptive control system particularly suited for combination in a numerically controlled system to adjust feed and speed and to provide compensation information to correct for size variations due to cutter deflection.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

In its preferred form as exemplified in a milling operation, the invention employs a control mechanism which controls spindle speed and feed velocity as a function of the ratio of cutter deflection over cutting force. The ratio can be expressed as $$\frac{d}{f_c} = \sqrt{\frac{d_x{}^2 + d_y{}^2}{f_c}}$$

where $d_x$ and $d_y$ are radial deflections of the milling cutter relative to the spindle axis and $f_c$ is the tangential cutting force which can be measured as the spindle torque with appropriate scaling for cutter diameter. This ratio is particularly effective in controlling the cutting operation since it is inversely proportional to the stiffness or rigidity of the machine and cutter and is virtually independent of width of cut, depth of cut, speed and feed. It is also directly proportional to friction at the chip and tool interface, hardness of the workpiece, flank wear of the tool and conditions of chatter. In its preferred form, the invention includes an override control by which both spindle speed and feed velocity are controlled between preset minimum and maximum values as a linear increasing function of cutting force for low level forces between zero and some selected small percentage of full scale cutting force, for example, from zero to one percent of full scale. This allows safe entry into tough skinned materials of unknown hardness and reduces work hardening by reducing cutting speed under cutter dwell conditions. A further feature of the control system is the provision of a network to increase the feed rate during periods of no cutter contact prior to entry of the cutter into the workpiece and after complete exit therefrom. The system also includes an override control network which reduces feed rate in accordance with a linearly decreasing rate when the cutter deflection exceeds a predetermined percentage of the maximum tolerable cutter deflection. Likewise, the spindle torque is subject to an override control network which reduces feed rate at a linear decreasing rate when the spindle torque load or cutting force exceeds a predetermined percentage of the maximum tolerable value to thus prevent spindle motor stall. By setting the percentages of the two last mentioned override controls reasonably high, there is a minimum sacrifice of production rate. Since the control system uses and therefore must measure the coordinate deflection of the cutter and produce an analog signal representative thereof, the system is readily adaptable to provide these analog signals to a numerical control system as correction signals to compensate for changes in workpiece size which would otherwise result from cutter deflection.

While the invention is described specifically herein as a system for controlling a milling machine, it should be understood that the same control system is adaptable for other operations, such as turning, boring and drilling operations as well since the system is effective to control both the rate at which a cutting edge is passed through a workpiece and the thickness of the chip which is removed thereby. A clear understanding of the construction and operation of the control system of this invention can be obtained from the following detailed description in which reference is made to the attached drawings wherein:

FIG. 1 is a simplified showing of a milling machine to which the control mechanism of this invention is applied.

FIG. 2 is a detailed view of a spindle torque transducer, partly in section.

FIG. 3 is a sectional view of a spindle deflection transducer element.

Figure 4A:
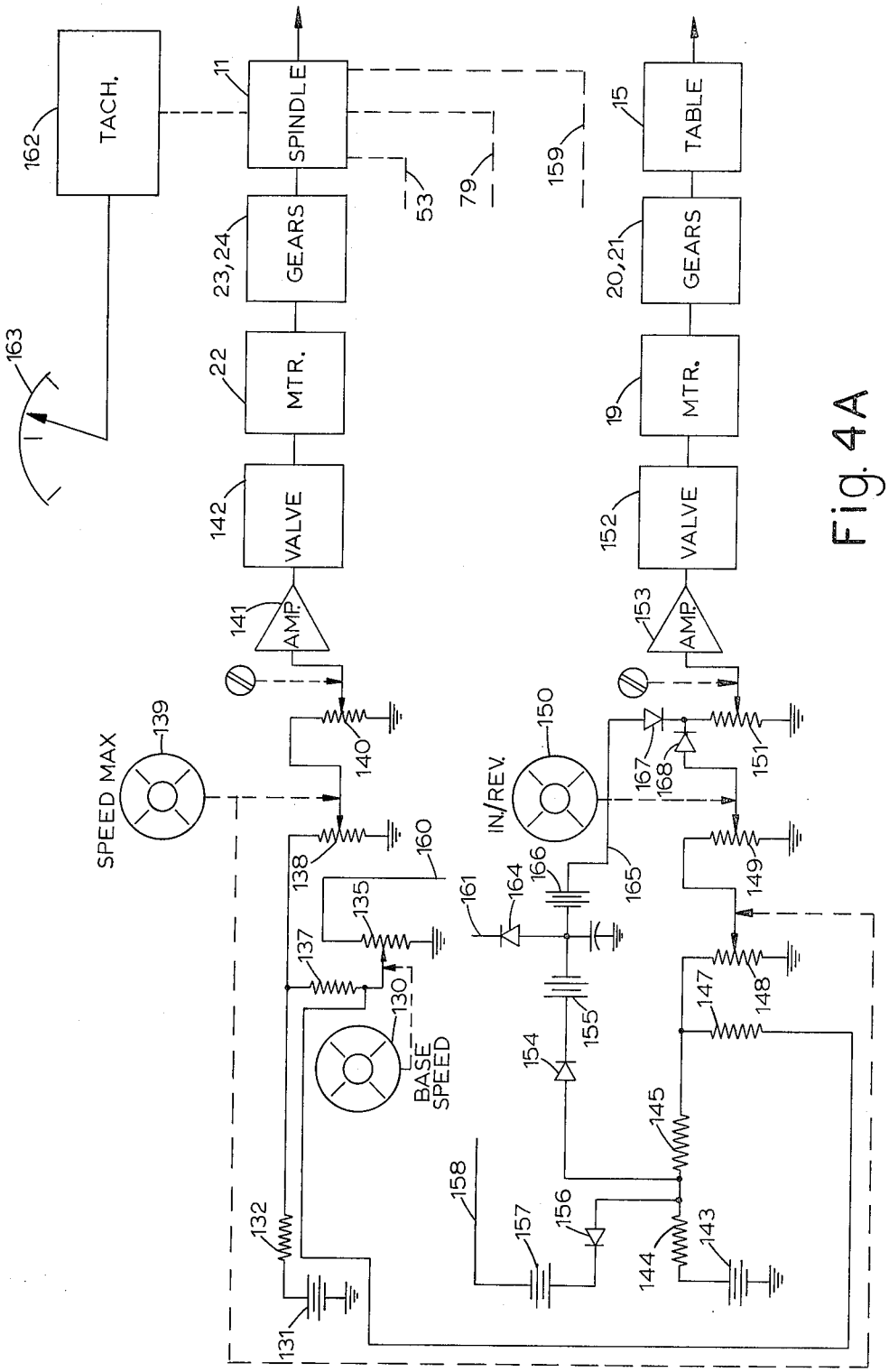
FIGS. 4A and 4B are a schematic control diagram for a milling machine.

In the preferred embodiment of the invention adapted for control of a milling machine and described herein, electrical transducers attached to the machine provide the signals for cutter deflection and cutting force. The mechanical elements and their electrical sensors are shown in FIG. 1 in simplified form representative of a standard type of knee and column milling machine and altered as will be apparent from the description. The machine column 10 houses a rotatable spindle 11, the forward end of which projects outward from the column 10 and which is conventionally formed to receive and hold a milling cutter 12. The cutter 12 when rotated with the spindle 11 and brought into contact with a workpiece 13 will remove material therefrom in a milling operation. In the example shown, the spindle 11 is rotatable at a fixed location and the workpiece 13 is moved into contact with the cutter 12 to provide the feed movement. The workpiece 13 is held in a fixture 14 that is securely attached on a machine table 15. The table 15 is slidably supported on a saddle 16 having longitudinal ways 17, 18 along which the table 15 is movable by energization of a motor 19. The motor 19 in the example herein described is a hydraulic motor having a constant torque output but a variable rate of operation. The motor 19 rotates a gear 20 which is in mesh with a rack 21 on the lower side of the table 15 to effect its movement along the ways 17, 18. The gear 20 and rack 21 are shown as representative of the mechanical connection between the motor 19 and table 15 and the drive might actually be any mechanical equivalent thereto such as a screw and nut mechanism or any other table drive well known in the machine tool art. Rotation of the spindle 11 is likewise shown in a representative form with a constant torque but variable speed motor 22, in the example shown it is also a hydraulic motor, driving a gear 23 which is in mesh with a gear 24 fixed to the spindle 11. The gears 23, 24 provide a predetermined drive ratio between the motor 22 and spindle 11 and while shown simply as two gears, they might be a transmission including a plurality of gears selectively shiftable to provide a number of predetermined drive ratios to the spindle 11. Transmissions of this type are old in the art and need not be described in detail with regard to the present invention.

The machine described includes a set of sensors 25 in a transducer unit around the forward end of the spindle 11 to provide signals which are used in the production of an analog voltage proportional to the deflection of the end of the spindle 11 in which the cutter is fixed during a cutting operation. This signal is proportional to the deflection of the cutter 12 itself. The sensors 25 are each the same and are arranged to provide deflection information referenced to coordinate directions. Therefore the sensors 25 are spaced ninety degrees apart around the spindle 11 and diametrically opposed pairs each furnish the deflection information relative to one of the two coordinate axes. One of the sensors 25 is shown in detail in FIG. 3. It is comprised of a mounting block 26 which is adapted for fixed attachment to the column 10 adjacent the spindle 11. A cantilever arm 27 extends outward from the block 26 and a mounting bracket portion 28 is formed at its end opposite to the block 26. An axle screw 29 is fixed in the bracket portion 28 and has received therearound a preloaded antifriction roller 30, the outer roll of which is adapted to engage and roll on an annular collar 31 fixed to the spindle 11 and ground in place thereon so as to be exactly concentric therewith. The cantilever arm 27 has a strain gauge 32 attached integrally therewith on each side. The strain gauges 32 can be of any well known type producing an electrical signal variation as a result of minute changes in dimension of the surface on which they are mounted. The strain gauges 32 are attached on opposite sides of each of the sensors 25 and there is a sensor 25 on diametrically opposed sides of the spindle 11. This provides a system in which signals due to thermal growth of the sensors 25, the spindle 11 and collar 31 cancel themselves out. The signal resulting from the strain gauges when connected in a conventional bridge circuit, is dependent solely upon spindle deflection produced by the cutting operation and it is directly proportional to deflection of the cutter 12. It should be noted that other types of sensors can be used to provide the spindle end or cutter deflection signals, for example, capacitance probes, pneumatic gap measuring devices and linearly variable differential transformer probes.

A spindle torque transducer 34 is provided on the spindle 11 and it produces a signal proportional to the torque strain of the spindle 11 during a cutting operation. Since the torque strain of the spindle 11 results from the wind-up of the spindle caused by opposition to rotation by the motor 22 due to the tangential cutting force on the cutter 12, the signal from the torque transducer unit 34 is directly proportional to and can be used as representative of the tangential cutting force with proper scaling for the cutter diameter factor that is inherent in the signal at this point. The transducer 34 is shown in detail in FIG. 2. Scaling of the signal from the transducer 34 is performed in an electrical circuit associated with the transducer 34 and to be described subsequently herein. A pair of spacer rings 35, 36 are fixed on the spindle 11 at spaced axial locations therealong. A torque tube 37 is received between the rings 35, 36 and is held in place by a pair of clamp rings 38, 39. A set of four strain gauges 40 are intimately attached on the torque tube 37 at locations spaced ninety degrees apart around the spindle 11. An insulating layer 41 is applied over the torque tube 37 and the strain gauges 40 and a set of four commutator rings 42–45 are received over the insulation 41. The commutator rings are each connected to one of four corner points of a bridge circuit formed by interconnecting the strain gauges 40 in the well known manner of a Wheatstone bridge. A pair of bearings 46, 47 are received over the torque tube 37 at each end and against the clamp rings 38, 39. A brush housing 48 is received over the bearings 46, 47 and is adapted for fixed location in the column 10, the spindle 11 and torque tube 37 being rotatably in unison relative thereto. A set of brush holders 49–52 are held in the housing 48 and each of these has a commutator brush therein in sliding electrical contact with a respective one of the rings 42–45. The brushes and holders 49–52 are the means by which the electrical signals from the strain gauges 40 are monitored and connected into the control circuit of FIGS. 4A, 4B. It should also be noted here that other equivalent means for producing a signal representative of the torque strain in the spindle exist and might be used in place of the transducer described, for example, a pair of synchro resolvers or a photoelectric-rotating disc apparatus.

Figure 4B:
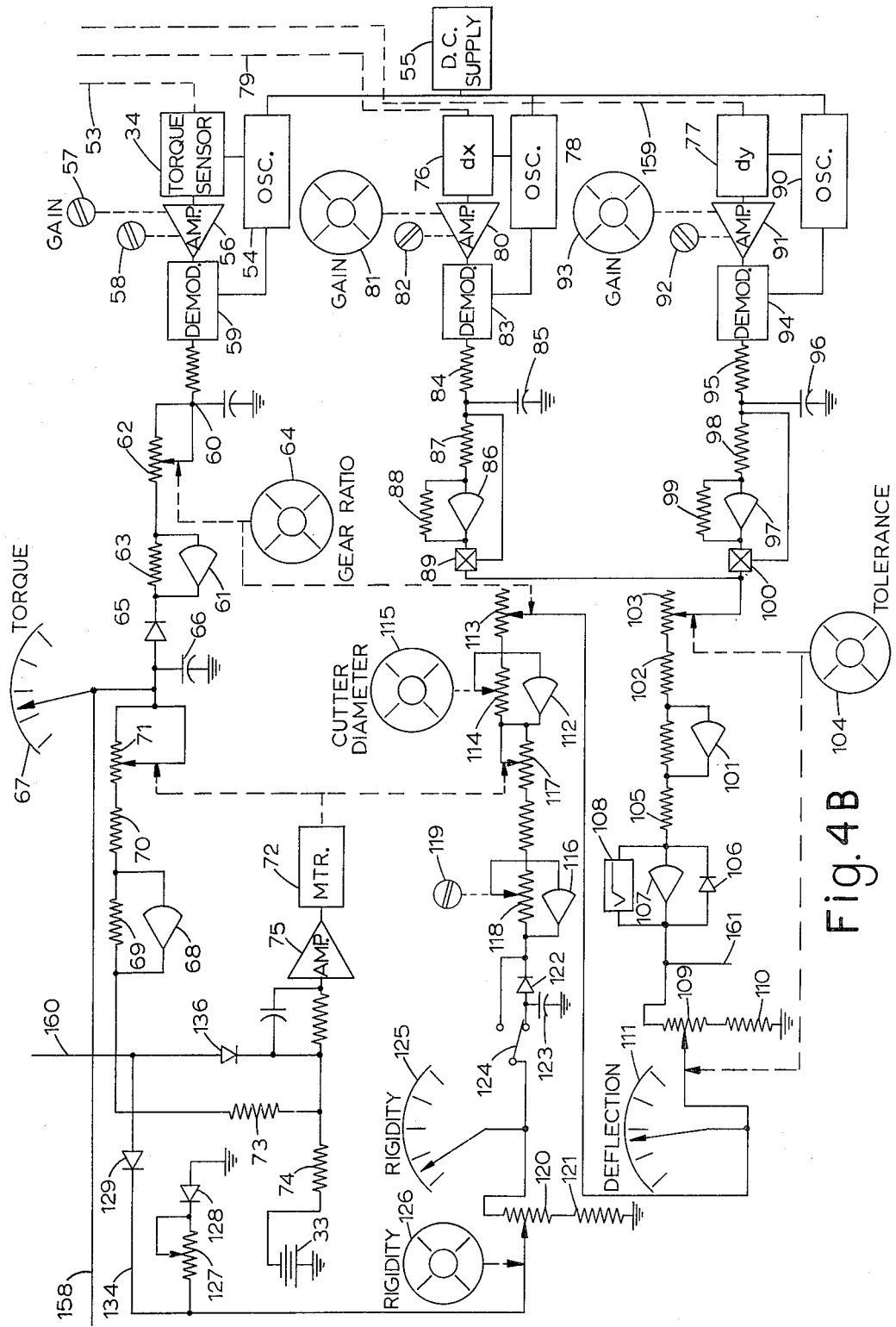

In FIG. 4B, there is shown the circuit which handles the cutter deflection and torque signals to put them in form for controlling the feed motor 19 and the spindle motor 22. The spindle torque sensor unit 34 which includes a bridge circuit comprised of strain gauges 40 as described and which is connected mechanically to the spindle 11, is shown as a box on FIG. 4B, the mechanical connection being indicated by the dashed line 53. An oscillator 54 energized from a power supply 55 furnishes an alternating signal of predetermined frequency and phase to the strain gauges of the sensor unit 34. An alternating signal of an amplitude dependent upon spindle torque strain is developed and connected to an amplifier 56, a conventional A.C. amplifier, having a gain adjustment potentiometer 57 and a zero balance adjustment 58 by which the amplifier 56 is regulated to produce an amplified signal representative of the spindle torque as it varies upward from no load conditions to maximum load conditions. The amplified spindle torque signal, in A.C. form, is passed to a detector and demodulator circuit 59 of conventional and well known type which receives an A.C. signal and produces a D.C. output signal directly proportional to the amplitude of the A.C. signal input. A reference A.C. signal is supplied to the demodulator 59 from the oscillator 54. The gain potentiometer 57 is adjusted such that for full rated motor torque, the output D.C. signal is equal to a predetermined voltage representative of that full torque output. The D.C. signal from the demodulator 59 is passed through a resistance-capacitance filter network 60 to eliminate spurious high frequency peaks and is then connected to an operational amplifier including a D.C. amplifier 61, an input resistance 62 and a resistance 63 parallel to the amplifier 61. The operational amplifier 61 functions to produce an output signal that is equal to the ratio of the parallel resistance 63 over the input resistance 62, the ratio times the input signal, the output signal having a sign reversal. Operational amplifiers of this type are well known in the analog computer art and a description of them can be found at pages 11–13 of "Electronic Analog Computers," by G. A. Korn and T. M. Korn, first edition published by McGraw-Hill Book Company, 1952. The input resistance 62 is an adjustable potentiometer having an adjusting dial 64 connected thereto and calibrated in accordance with the gear ratios available between the motor 22 and the spindle, shown in FIG. 1 as the ratio of the gears 23, 24, and therefore the dial 64 is set to provide a resistance ratio in the operational amplifier network 61 which scales the spindle torque signal in accordance with the gear ratio between the motor 22 and spindle 11 to produce a motor torque signal. The motor torque signal represents the amount of motor load due to the cutting forces and is an analog of the tangential cutting force being presented in a form for reference against rated motor torque which is a fixed value in the present embodiment. The torque signal scaled for gear ratio at the operaional amplifier network 61 passes to a peak hold network including a diode 65 and a capacitor 66 which functions to retain the peak value of the instantaneous torque signal, the network having a peak hold time constant several times the normal peak to peak interval of the torque signal. Conventional current flow, positive to negative is assumed in the symobls used in the drawings. Therefore the cathode side of the diodes shown is as with the diode 65 the right end while its anode is the left end or tail of the arrow. Due to the signal inversion at the output of the operational amplifier 61, the motor torque analog at this point is negative in polarity. The torque signal, scaled in accordance with the gear ratio to represent torque load of the motor 22 is connected to a meter 67 for a visual indication of spindle motor torque load, the meter having a dial calibrated in percent of available motor torque and a deflectable element moving a distance in accordance with the torque load signal amplitude.

The motor torque load signal is applied to an instrument servo system, the input side of which is another operational amplifier 68 that includes a parallel resistance 69 and the input resistances 70, 71, the latter resistor 71 being an adjustable potentiometer driven by a servo motor 72. The positive output of the amplifier 68 is applied to a summing network including resistances 73, 74 where it is summed with a negative reference voltage from a D.C. source 33. An error signal is picked off from between those resistances 73, 74 and is amplified in a servo amplifier 75, the output of which is used to drive the servo motor 72 in a direction to adjust the potentiometer 71 to a value such that the voltage output of operational amplifier 68 tends to remain at a constant predetermined level established by the D.C. source 33. The D.C. source 33 has been established as sufficient signal to hold the speed and feed rate at the selected minimum when the motor torque load signal is zero. Therefore, for torque signals above, say, one percent of full scale the operation of the motor 72 is dependent upon and proportional to the cutting force since the motor torque load signal is derived from the tangential cutting force and is directly proportional thereto. The operation of the servo motor 72 also provides an input representing cutting force to a computer circuit to be described later herein to produce the ratio signal by which the feed and speed parameters are adjusted to make the complete system self adaptive to cutting conditions in accordance with the deflection/cutting force ratio.

The strain gauges 32 on the deflection sensors 25 are connected in two bridge circuits, shown as blocks 76, 77 on FIG. 4B, to produce two deflection signals representing cutter deflection in respect to coordinate axes normal to the spindle axis. Each of the two bridge circuits includes four strain gauges 32, two on each of two sensors on opposite sides of the spindle 11. One axis can be referenced as the X-axis and the bridge 76 produces a signal with respect to that axis when energized from an oscillator 78 which is also supplied power from the supply 55 and when deflected during a cutting operation. As in the torque circuit, mechanical connection between the strain gauges 32 of the bridge circuit 76 and the spindle 11 is represented by a dashed line 79. The deflection signal from the bridge circuit 76 is passed to an A.C. amplifier 80 where it is amplified in accordance with a gain factor that is set by a potentiometer 81. The amplifier zero balance is provided by an adjustment screw 82 controlling the setting of a potentiometer as is conventional in A.C. amplifiers. The amplified A.C. deflection signal is applied to a detector and demodulator circuit 83 and a D.C. deflection signal is produced therein by a circuit like that in the torque signal demodulator 59. A network including a resistor 84 and a capacitor 85 filters off spurious high frequency peaks and the signal is passed to a squaring network which includes an operational amplifier 86 with equal input and parallel resistances 87, 88 to change the sign of the D.C. deflection signal before supplying it as one of the two inputs to a multiplier circuit 89. The other input is the unchanged X-axis deflection signal from the filter circuit. The circuit 89 is a conventional multiplier circuit of the biased diode type familiar in analog computers, an example of one such circuit being shown and described at pages 3–42, 3–43 of "Computer Handbook," by H. D. Huskey and G. A. Korn, first edition, published by McGraw-Hill Book Company, 1962. The output from the multiplier 89 is a D.C. analog voltage representing the square of the X-axis deflection times a predetermined constant scale factor.

The other reference axis of cutter deflection can be termed the Y-axis and the bridge 77 then produces a Y-axis deflection signal when the strain gauges 32 therein are energized by the A.C. signal from an oscillator 90. The mechanical connection from the spindle 11 to the bridge circuit, 77 is represented by the dashed line 159. The A.C., Y-axis deflection signal from the circuit 77 is amplified to a usable level in an amplifier 91, identical to the amplifier 80 and which is equipped with a zero balance adjustment 92 and a gain potentiometer adjustment 93. The amplified A.C. deflection signal is then transmitted to a detection and demodulator circuit 94 where a D.C. signal proportional to the Y-axis cutter deflection is produced and passed on to a filter network, including a resistor 95 and a capacitor 96, which filters off spurious high frequency peaks from the D.C. signal. The D.C. signal in this case is also squared in a network including an operational amplifier 97 with an input resistance 98 equal to a parallel resistance 99 and a multiplier network 100 which is identical to the multiplier network descirbed hereinbefore for the X-axis cutter deflection signal.

The two squared cutter deflection signals are summed just beyond the multiplier circuits 89, 100 to form a signal which is an analog of the sum of the squares, the term in the equation under the numerator radical in the previously set-out ratio. The sum of squares signals is then connected as the input to a computer circuit network including an operational amplifier 101 through serial input resistances 102, 103, the latter of which is an adjustable potentiometer connected to a dial 104. The dial 104 is a deflection tolerance adjustment and is calibrated in terms of tolerable deflection and is adjusted such that when a predetermined maximum resultant deflection of the cutter 12 occurs, the output from the operational amplifier 101 is equal fully to a predetermined reference voltage which would result in zero feed as will be described later herein. The tolerance scaled signal is then connected to a network including an input resistance 105, a feedback diode 106, an operational amplifier 107 and a square root circuit 108 which network comprises a conventional analog computer square root computing circuit. In the computation, the square root is extracted by a squaring operation in the feedback path of a high gain amplifier as used in operational amplifiers, the squaring network being a network as shown in the previously cited portion of the "Computer Handbook" by Huskey and Korn. The square root signal is developed across a divider network including the resistances 109, 110 and a portion is attenuated there in accordance with the square root of the previous upward scaling factor of the maximum tolerable deflection setting since the resistance 109 is a variable potentiometer set by connection to the tolerance selector dial 104. A meter 111 is connected to monitor the readjusted deflection signal from the potentiometer 109 and the meter 111 is scaled to read directly the magnitude of deflection. The gain adjustments 81, 93 in the A.C. amplifiers are used in circuit calibration during set-up of the machine and their adjustment is made such that the meter 111 reads the same deflection as measured in coordinate directions by a dial indicator at the forward end of the spindle 11 for a given movement of the cutter 12. The tolerance selector dial 104 produces an adjustment independent of the gain adjustment 81, 93 and at the potentiometer 109, a portion of the square root signal is attenuated such that the upward scaling due to the adjustment at the potentiometer 103 is off-set and the meter 111 produces an accurate reading of deflection. The purpose of the upward scaling at the tolerance potentiometer 103 will be seen later herein in connection with override control at excessive cutter deflections.

The square root signal from the potentiometer 109 which is an analog of the resultant cutter deflection is applied as an input signal to another computer circuit through an operational amplifier 112 having an input potentiometer 113 that is set by the spindle gear ratio selector dial 64. The parallel resistance 114 is adjusted in response to the setting of a cutter diameter dial 115 connected thereto such that the output from the operational amplifier 112 is representative of the square root of the sum of the squares of X and Y axis deflections appropriately scaled for the particular gear drive ratio to maximum gear ratio and cutter diameter. These factors are combined with the square root signal which is next to be combined with the motor torque signal that has been produced using scale factors of gear ratio and cutter diameter so that these factors will cancel out to give the desired ratio of the square root of the sum of the deflections squared over the tangential cutting force. The scaled square root signal then is applied as an input to an operational amplifier 116 through the input potentiometer 117 which is mechanically connected and driven by the servo motor 72 so that the input resistance is a function of the motor torque signal. The parallel resistance 118 of the amplifier 116 is a potentiometer set by a trim adjustment 119 for the particular machine such that the parallel resistance is sufficient to provide a reciprocal factor to cancel out a factor for maximum torque times maximum gear ratio. The former is also a factor in the torque signal by which factor the potentiometer 117 is adjusted while the latter is a result of the setting of the potentiometer 113. The output from the operational amplifier 116 is then representative of the desired ratio of square root of the sum of the squares of X-axis and Y-axis deflections over cutting force, the ratio times the amplification of the circuits. The ratio signal from the amplifier 116 is connectable to a divider network including resistances 120, 121 either directly or through a peak hold network comprised of a diode 122 and capacitor 123, the choice being made by the condition of a two position selector switch 124. When connected directly, the ratio signal is used to control in an instantaneous signal mode but provides only peak response control when the switch 124 is in the position shown wherein it applies the signal as a peak to peak value to the divider network 120, 121. As shown, the signal is also connected to a meter 125 which is calibrated in terms of the reciprocal value of the ratio signal and this is representative of the combined rigidity of the machine and cutting system. A rigidity limit selector 126 is provided which adjusts the resistance potentiometer 120 and is set so that a maximum signal coupled therefrom is equal to a predetermined voltage when the meter 125 indicates a rigidity having a numerical value equal to the reciprocal value of the shear strength of the material to be machined. A shunt limiter circuit including a trim potentiometer 127 and a diode 128 is connected to the circuit from the resistance 120. The potentiometer 127 is adjusted such that the shunt limiting occurs when the D.C. signal from the resistance 120 reaches the predetermined voltage for the preset system rigidity. The diode 128 then conducts to limit the D.C. signal to a maximum amplitude equal to that predetermined voltage. The signal tapped off from the potentiometer 120 varies from null to a maximum negative value due to the design of the circuitry described and therefore the ratio signal is limited to a maximum negative value. The purpose of this limiting is to set the minimum or base speed of the control system as the cutter deflection and cutting forces increase during a cut. As a result of the shunt limiting, the feedback ratio signal applied to the speed controllers for the spindle and feed motors 22, 19 cannot exceed the predetermined level established by the shunt limiting circuit. The adjustment of the rigidity limit potentiometer 120 scales the signal therefrom in accordance with a selected rigidity of the system the value of which is the reciprocal of the shear strength of the material being cut. When the ratio signal reaches the limited value, the desired rigidity of the system is reached and the meter 125 is reading the shear strength of the material. The ratio signal is then limited to a maximum value for determination of a minimum speed even though cutting conditions may exceed the preset rigidity limits. This is the base speed or minimum speed override as it functions during a cutting operation.

The minimum spindle speed and feed speed or feed rate of the system under cutting conditions can be adjusted upward to a higher value by the adjustment of a potentiometer 135 across which the ratio signal from the rigidity adjustment potentiometer 120 is developed, the ratio signal being connected via a conductor 134 and through an isolating diode 129 to a conductor 160 in turn is connected to the potentiometer 135, FIG. 4A. The potentiometer 135 is adjusted by means of a dial 130 mechanically connected thereto and which is calibrated in accordance with percentage of the speeds of both the spindle 11 and the worktable 15. A reference spindle speed voltage from a source 131 is connected through resistances 132, 137 to the wiper contact of the potentiometer 135. The source 131 connects a voltage of a sign that is opposite to the sign of the ratio signal at the resistance 135 and the reference voltage from the source 131 and that portion of the ratio signal picked off at the potentiometer 135 are summed to provide a spindle speed control signal. Any amount of the ratio signal from all to none can be picked off from the potentiometer 135 and therefore the minimum speed signal input to the spindle speed controller can be adjusted to a level upward from a minimum corresponding to when the entire negative amplitude signal from the resistance 135 is used or it can be made independent thereof and be determined only by the reference voltage from the source 131 which is the maximum open loop speed situation when no signal is taken from the resistance 135.

The potentiometer 135 is also used for control of the entry speed of the system, i.e., the speed at which a cut is begun upon first engagement of the cutter 12 and workpiece 13. The potentiometer 135 is only effective for production of a speed control signal in the base entry mode of control when a diode 136 in a conductor 160, FIG. 4B, is conducting. This occurs only when very little or no torque signal is sensed and the potential at the input to the servo amplifier 75 goes to a predetermined negative level more negative than the ratio signal at line 134 at which time the diode 136 conducts and the diode 129 is not conducting. There is no torque signal when there is no engagement between the cutter 12 and the workpiece 13. As the workpiece 13 is engaged by the cutter 12, the spindle torque increases and the signal at line 160 goes less negative to begin to increase the speed signal from the potentiometer 135. At this same time, the ratio signal begins to go in the negative direction in line 134. When the line 134 becomes more negative than the point between the resistances 73, 74, the diode 129 conducts and the diode 136 cuts off. Control of spindle and feed speeds is then transferred from the override mode to the in process ratio signal mode. The control signal from the potentiometer 135 is a negative value added to the positive voltage of the reference source 131 through a resistance adding network including the resistance 132 and a resistance 137. Thus, the signal upon which the spindle 11 speed depends when the cutter 12 first engages the workpiece 13 is determined also by the setting of the potentiometer 135. This is the base or minimum speed override functioning prior to and during initial engagement of the work 13 by the cutter 12. The same override is reapplied as the cutter 12 is leaving the workpiece 13 since the torque signal decreases at that time toward the no load condition.

The speed control signal which is the sum of either the ratio signal and the reference potential from the source 131 or the minimum entry speed signal and the reference potential is then scaled by a potentiometer 138 mechanically set by a dial 139 to determine the range of speeds in which the spindle 11 will be rotated, that is, the speed control signal is scaled to provide a selected maximum speed of operation for the full reference voltage from the source 131. A trimpot 140 also is in series with the speed signal input to a servo amplifier 141 and this trimpot is set under open loop conditions with a full reference voltage signal at the source 131 and no signal taken from the potentiometer 135 to provide the full rated opening of a servo valve 142 controlling motor speed for drive of the spindle 11 so that speed signal attenuation at the speed selection potentiometer 138 will provide a properly scaled input to the servo-amplifier 141 to produce a selected speed range. The amplified output from the amplifier 141 is connected to the servo valve 142 which controls the speed of operation of the spindle motor 22. It can be seen then that when the ratio signal produced from the deflection and torque sensing circuits increases in amplitude, the speed signal input to the spindle motor drive is reduced to slow the spindle 11. The lowest possible speed limit is determined by the shunt limiter circuit, the diode 128, and this can be adjusted upward by partial attenuation of the ratio signal at the potentiometer 135. The speed of the spindle is constantly monitored by a tachometer generator 162 and this presents a visual display on a dial 163 for the machine operator's convenience.

The ratio signal from the potentiometer 135 is also connected to the speed control circuit for the feed motor 19 and is effective in the same manner for producing a feed rate signal. A feed reference voltage source 143 is connected at one end of a voltage summing network including the resistances 144, 145, 147. The source 143 applies a positive fixed potential at one end of the summing network to which the negative ratio signal from the potentiometer 135 is algebraically added to produce a feed rate signal. The base entry speed signal from the potentiometer 135, when effective, is similarly summed in the same network. The resulting feed rate signals are developed across a potentiometer 148 that is ganged with the speed setting dial 139 which also sets the potentiometer 138 in the spindle speed control circuit described. The basic ratio of chip per tooth in a cutting operation is maintained by ganging these potentiometers 138, 148 together. Further attenuation of the feed rate signal is possible at a potentiometer 149 that is set by a dial 150 which is calibrated in inches per revolution to provide a selective adjustment of chip thickness per cutter tooth. The adjusted feed rate signal is then applied to a trimpot 151 which is set in the same manner as the trimpot 140 under open loop conditions to calibrate a servo valve 152 and the motor 19 for maximum speed operation. The signal from the trimpot 151 is applied as an input to a servo amplifier 153 which operates the servo valve 152 to control the motor 19.

The control of the feed rate of the table 15 is subject to override controls to reduce it toward a full stop when either spindle torque or cutter deflection approach predetermined maximum upper limits. These override controls operate to reduce the potential between the divider resistances 144, 145 in the adder network described when either the torque signal or the deflection signal exceeds a predetermined level. By reducing the potential at this point, the speed signal input to the feed motor controller circuits is reduced to slow the operation of the motor 19 toward a full stop. For the purpose of excessive cutter deflection override, a diode 154 is connected in a conductor 161 that completes a circuit from the point between the resistances 144, 145 to the output of the square root circuit 108 in the cutter deflection signal circuit described. Included in the circuit with the diode 154 is a constant potential difference device 155, represented schematically as a D.C. battery, which can be any form of well known circuit maintaining a constant potential difference between the diode 154 and the output of the square root circuit 108. The output signal from the square root circuit 108 in the described embodiment is a negative D.C. signal and the potential difference device 155 maintains the cathode side of the diode 154 at a potential that is positive with respect to its anode side until the signal from the square root circuit 108 reaches a predetermined negative level. At that time, the diode 154 begins to conduct due to its cathode going more negative than its anode. The junction point between the resistances 144, 145 then goes in a negative direction and as the signal from the square root circuit exceeds the predetermined level, the input signal to the feed speed controller is reduced and the feed rate is correspondingly reduced. The maximum cutter deflection at which the signal from the square root circuit 108 exceeds the predetermined level to cause the feed rate reduction is determined by the setting of the tolrance selector dial 104 which is connected to adjust the scale of the signal input to the square root circuit 108 at the potentiometer 103. The signal output from the square root circuit 108 reaches the predetermined level at which the feed rate begins to reduce before the deflection reaches its maximum tolerable amount so that feed rate linearly approaches zero as deflection approaches maximum and therefore the deflection will never reach the maximum tolerable amount.

The maximum cutting force and spindle torque are limited in a similar overriding manner as the maximum deflection by use of the motor torque signal. The feed rate is reduced to reduce the chip thickness which approaches zero thickness as the motor torque approaches its maximum amount. Since chip thickness is reduced as the motor torque exceeds a predetermined level and approaches maximum, the torque can never reach maximum. The torque limiting is performed by a diode 156 and a constant voltage drop device 157 connected in series in a conductor 158 between the junction between the resistances 144, 145 and the motor torque analog voltage at the meter 67. The motor torque signal at the meter 67 is also a negative signal due to sign reversal provided by the operational amplifier 61. The voltage drop device 157 and diode 156 operate in the same manner as the voltage drop device 155 and diode 154 of the deflection limiting circuit described. Should both the deflection and motor torque approach maximum simultaneously, which would be a rarity, the effect of the two override circuits would be summed and the feed rate would reduce in the same manner to prevent an excessive amount of either one.

The control system includes an additional override network that functions during the time that the cutter 12 is completely clear of the workpiece 13 and is not either entering or leaving a cut. This network acts to increase the feed rate to the preset maximum and causes the cutter 12 to pass through cut interruptions at a rate in excess of the base entry rate, thereby speeding up an operation where a series of separated cuts are to be made. This override network is very quickly removed from control when the cutter 12 first engages the workpiece 13. A shunt circuit extends from the output of the square root network 108 through the line 161 and a blocking diode 164 to a conductor 165 in which a constant voltage difference is maintained by a voltage drop device 166. Another blocking diode 167 connects this shunt circuit to the trimming potentiometer 151. When there is no output signal from the square root network 108, the last mentioned dioded 167 is caused to conduct and to apply a potential at the potentiometer 151 that results in maximum feed rate operation of the motor 19. A further blocking diode 168 prevents the signal from being fed back into the control circuit in the reverse direction. When the output of the square root network 108, a negative signal, reaches an amplitude equal to or greater than the potential difference established by the device 166, the diode 167 is caused to stop conducting and the control of feed rate is transferred to the previously described circuitry for base entry and ratio signal control. It should be pointed out that the output of the square root network 108 is scaled upward to a relatively high amplitude by the operational amplifier 101 as previously described and that very little cutter deflection is required to cause the diode 167 to stop conduction. That is to say, the circuit is extremely sensitive to cutter contact with the workpiece 13 and the shunt circuit is blocked at initial cutter contact with the workpiece 13.

The complete system as described senses both spindle torque and spindle end deflection and computes a signal varying in amplitude in accordance with the ratio of the cutter deflection analog over cutting force analog. This signal is used simultaneously to regulate both the speed of cutter rotation and work feed rate while the cutting is proceeding within defined tolerances. When either of the analog signals proportional to cutting force or cutter deflection tends to be excessive, override control is effected to reduce feed rate, the override being set at a reasonably high percentage of the maximum allowable cutting force and cutter deflection. The cutting force override is operated directly in response to a signal dimensioned in terms of spindle motor torque since the spindle motor torque load is proportional to the load reflected thereto by the force acting between the work 13 and cutter 12. In addition, a base entry speed is provided when cutting first occurs. Also, a low speed limiting is performed to override the ratio signal and prevent complete stoppage of both spindle rotation and feed movement in the event of the ratio signal reaching a predetermined maximum level. During the time of feed of the work relative to the cutter when there is no contact between the two, the feed rate is increased to shorten operation time but at the instant that contact occurs, the control is transferred to the base entry speed control and after entry a transfer of control is made to the ratio network. While the invention has been described in connection with one possible form or embodiment thereof, it is to be understood that the present discloseure is illustrative rather than restrictive and that changes and modifications may be made without departing from the spirit of the invention or the scope of the claims which follow.

What is claimed is:

1. In a machine tool having a workpiece supported thereon, a cutting tool therein extending toward the workpiece and a feed motor connected for relatively moving the cutting tool and workpiece together, a mechanism for controlling the operation of the feed motor comprising in combination:
   (a) means for producing a first output signal proportional to the cutting force acting between the cutting tool and workpiece,
   (b) means for producing a second output signal proportional to the resultant deflection of the cutting tool,
   (c) means for producing a control signal proportional to the ratio of said second output signal to the first output signal, and
   (d) means for controlling the rate of operation of the feed motor as an inverse function of said control signal.

2. The machine tool motor control mechanism of claim 1 wherein:
   (a) means are provided for limiting said control signal to a predetermined maximum amplitude to establish a minimum rate of operation of the feed motor.

3. The machine tool motor control mechanism of claim 1 wherein:
   (a) means are provided for overriding said control signal to reduce the rate of operation of the feed motor when said first output signal exceeds a predetermined amplitude.

4. The machine tool motor control mechanism of claim 1 wherein:
   (a) means are provided for overriding said control signal to reduce the rate of operation of the feed motor when said second output signal exceeds a predetermined amplitude.

5. The machine tool motor control mechanism of claim 1 wherein:
   (a) means are provided for producing an override signal when said first output signal is of an amplitude below a predetermined level,
   (b) means are provided for substituting said override signal for said control signal, and
   (c) said means for controlling the rate of operation of the feed motor responds to said override signal to operate said feed motor as an inverse function thereof.

6. In a machine tool having a workpiece supported thereon, a cutting tool therein extending toward the workpiece and a feed motor connected for relatively moving the cutting tool and workpiece together, a mechanism for controlling the operation of the feed motor comprising in combination:
   (a) means for producing a first output signal proportional to the cutting force acting between the cutting tool and workpiece,
   (b) means for producing a second output signal proportional to the resultant deflection of the cutting tool,
   (c) means for producing a control signal proportional to the ratio of said second output signal to the first output signal, (d) means for limiting said control signal to a predetermined maximum amplitude, (e) means for controlling the rate of operation of the feed motor as an inverse function of said control signal, said predetermined maximum amplitude of control signal establishing the minimum rate of operation thereof, and (f) means for overriding said control signal to reduce the rate of operation of said feed motor when either of said first and second output signals exceeds a predetermined maximum amplitude.

7. In a machine tool having a workpiece supported thereon, a rotatable cutting tool therein extending toward the workpiece, a spindle motor connected to the cutting tool for rotation thereof and a feed motor connected for relatively moving the cutting tool and workpiece together, a mechanism for controlling the rates of operation of the spindle and feed motors comprising in combination:

(a) means for producing a first output signal proportional to the tangential cutting force acting between the cutting tool and workpiece, (b) means for producing a second output signal proportional to the resultant deflection of the cutting tool away from the workpiece, (c) means for producing a control signal proportional to the ratio of said second output signal to the first output signal, and (d) means for simultaneously controlling the rates of operation of the spindle and feed motors as inverse functions of said control signal.

8. The machine tool motor control mechanism of claim 7 wherein:

(a) means are provided for limiting said control signal to a predetermined maximum amplitude to establish predetermined minimum rates of operation of said spindle and feed motors.

9. The machine tool motor control mechanism of claim 7 wherein:

(a) means are provided for overriding said control signal to reduce the rate of operation of said feed motor when either of said first and second output signals exceeds a respective predetermined maximum amplitude.

10. The machine tool motor control mechanism of claim 7 wherein:

(a) means are provided for producing an override signal when said first output signal amplitude is below a predetermined level, and (b) means are provided for connecting said override signal to said means for controlling the rates of operation of the spindle and feed motors in place of said control signal.

11. In a machine tool having a workpiece supported thereon, a cutting tool support member therein, a tool extending therefrom at one end toward the workpiece and a feed motor connected for relatively moving the cutting tool and workpiece together, a mechanism for controlling the operation of the feed motor comprising in combination:

(a) a first transducer unit connected to said cutting tool support member and operable to produce an output signal proportional to the cutting force between the tool and workpiece, (b) a second transducer unit connected to the cutting tool support member at said one end thereof and operable to produce signals proportional to deflection of the cutting tool away from the workpiece in coordinate directions, (c) a first computer circuit connected to the output signals of said second transducer unit and operable to produce an analog signal proportional to the square root of the sum of the squared values of said second transducer outputs, (d) a second computer circuit connected to the output signal of said first transducer unit and to said first computer circuit analog signal and operable to produce an output control signal proportional to the ratio of said first computer circuit output analog to said first transducer unit output, and (e) a motor controller connected to said feed motor and responsive to said control signal output from said second computer circuit to operate the feed motor at a rate inversely proportional to said control signal output.

12. The mechanism of claim 11 wherein:

(a) means are provided for producing a predetermined maximum feed rate signal in the absence of a signal from said second transducer unit, and (b) said motor controller acts directly in response to said maximum feed rate signal to operate the feed motor at a corresponding rate.

13. The machine tool motor control mechanism of claim 11 wherein:

(a) a first override circuit is connected between said first computer circuit and said motor controller and is operable to connect said first computer output analog signal to said motor controller when the amplitude thereof exceeds a predetermined level, (b) a second override circuit is connected between said first transducer unit and said motor controller and is operable to connect said first transducer unit output signal to said motor controller when the amplitude thereof exceeds a predetermined level, and (c) said motor controller is responsive to said first computer output analog and said first transducer unit output signal, when connected thereto, to reduce the rate of operation of said feed motor below the rate produced thereby in response to said control signal output from said second computer circuit.

14. The machine tool motor control mechanism of claim 11 wherein:

(a) a shunt limiter circuit is connected to said second computer circuit at the output thereof and is operable to limit said control signal output therefrom to a predetermined maximum amplitude to establish a minimum rate of operation of said feed motor, and (b) a selectively variable attenuation circuit is connected between said second computer circuit and said motor controller and is operable to dissipate a selected portion of said control signal output to raise the minimum rate of operation of said feed motor.

15. In a machine tool having a workpiece supported therein, a rotatable spindle with a cutting tool fixed on one end thereof extending toward the workpiece, a spindle motor connected to the spindle for rotation thereof and a feed motor connected for relatively moving the cutting tool and workpiece together, a mechanism for controlling the operation of the spindle and feed motors comprising in combination:

(a) a first electro-mechanical transducer unit connected to said spindle and operable to produce an output signal proportional to the tangential forces acting on said cutting tool, (b) a second electro-mechanical transducer unit connected to said spindle at said one end thereof and operable to produce output signals proportional to the deflection of said cutting tool away from the workpiece in coordinate directions, (c) a first computer circuit connected to the output signals of said second transducer unit and operable to produce an output analog signal proportional to the square root of the sum of the squared values of said second transducer unit outputs, (d) a second computer circuit connected to said first transducer unit output signal and to said first computer circuit output analog signal and operable to produce an output control signal proportional to the ratio of said first computer output analog to said first transducer unit output, and (e) a pair of motor controllers, each of said controllers connected to a respective one of the spindle and feed motors, said controllers responsive to said control signal output from said second computer circuit to operate said spindle and feed motors at a rate inversely proportional to said control signal output.

16. The machine tool motor control mechanism of claim 15 wherein:
(a) a first override circuit is connected between said first computer circuit and the one of said motor controllers connected to said feed motor and is operable to connect said first computer output analog signal to said one motor controller when the amplitude thereof exceeds a predetermined level,
(b) a second override circuit is connected between said first transducer unit and said one motor controller to connect said first transducer unit output signal to said one motor controller when the amplitude thereof exceeds a predetermined level, and
(c) said one motor controller is responsive to said first computer circuit output analog and said first transducer unit output signal, when connected thereto, to reduce the rate of operation of said feed motor below the rate produced thereby in response to said control signal output from said second computer circuit.

17. The machine tool motor control mechanism of claim 16 wherein:
(a) a shunt limiter circuit is connected to said second computer circuit at the output thereof and is operable to limit said control signal output therefrom to a predetermined maximum amplitude to establish a minimum rate of operation of said feed and spindle motors, and
(b) a selectively variable attenuation circuit is connected between said second computer circuit and said motor controllers and is operable to dissipate a selected portion of said control signal output to raise the minimum rates of operation of said feed and spindle motors.

18. The machine tool motor control mechanism of claim 17 wherein:
(a) an override circuit is connected between said first transducer unit and said variable attenuation circuit, said override circuit effective until said first transducer unit output signal reaches a predetermined amplitude to connect a spindle speed override signal to said variable attenuation circuit, and
(b) said one motor controller is responsive to said spindle speed override signal to operate the spindle motor at a rate inversely proportional thereto.

19. In a machine tool having a workpiece supported therein, a rotatable spindle with a cutting tool fixed on one end thereof extending toward the workpiece, a spindle motor connected to the spindle for rotation thereof and a feed motor connected for relatively moving the cutting tool and workpiece together, a mechanism for controlling the operation of the spindle and feed motors comprisinng in combination:
(a) a first sensor unit connected to the spindle and operable to produce an output electrical signal corresponding to the torque strain thereof,
(b) a first circuit connected to said first sensor unit operable to produce an analog signal for the cutting force between the cutting tool and workpiece,
(c) means for scaling said output from the first sensor unit to account for the diameter of the cutting tool,
(d) a second sensor unit connected to the spindle at said one end thereof and operable to produce output electrical signals proportional to the deflection of the cutting tool away from the workpiece with respect to coordinate axes,
(e) a second circuit connected to said second sensor unit operable to produce an analog signal for the resultant deflection of the cutting tool,
(f) a third circuit connected to said first and second circuits and operable to compute an analog signal proportional to the ratio of said second circuit analog signal to said first circuit analog signal,
(g) means for controlling said spindle motor to operate at a rate inversely proportional to said third circuit analog signal, and
(h) means for controlling said feed motor to operate at a rate inversely proportional to said third analog signal.

20. The machine tool motor control mechanism of claim 19 wherein:
(a) a gear mechanism connects the spindle motor to the spindle for rotation in accordance with a predetermined drive ratio,
(b) means are provided in said first circuit for scaling said first sensor unit output signal in accordance with said drive ratio to produce a motor torque load analog signal for the spindle motor, and
(c) a network is connected between said first circuit and the means for controlling said feed motor and is responsive to said motor torque load analog signal to reduce the rate of operation of said feed motor independently of said third circuit analog signal when said feed motor torque load exceeds a predetermined percentage of full rated motor output torque.

21. The mechanism of claim 19 wherein:
(a) means are provided responsive to an absence of an output signal from said second sensor unit for establishing the rate of operation of said feed motor at a predetermined maximum feed rate.

No references cited.

WILLIAM W. DYER, JR., *Primary Examiner.*

UNITED STATES PATENT OFFICE
CERTIFICATE OF CORRECTION

Patent No. 3,220,315                        November 30, 1965

Richard A. Mathias

It is hereby certified that error appears in the above numbered patent requiring correction and that the said Letters Patent should read as corrected below.

Column 2, lines 12 to 15, the formula should appear as shown below instead of as in the patent:

$$\frac{d}{f_c} = \sqrt{\frac{d_x^2 + d_y^2}{f_c}}$$

This certificate supersedes Certificate of Correction issued October 10, 1967.

Signed and sealed this 22nd day of October 1968.

(SEAL)
Attest:

EDWARD M. FLETCHER, JR.                 EDWARD J. BRENNER
Attesting Officer                         Commissioner of Patents